United States Patent [19]

Hattori et al.

[11] 4,432,245
[45] Feb. 21, 1984

[54] GRINDING MACHINE MOTOR WITH A TORQUE SENSOR

[75] Inventors: Mitsuro Hattori, Ibaragi; Koosuke Harad, Fukuoka; Tadahiko Goto, Kita-Kyushu, all of Japan

[73] Assignees: Technology; Ministry of International Trade & Industry, both of Tokyo, Japan

[21] Appl. No.: 244,916

[22] Filed: Mar. 18, 1981

[30] Foreign Application Priority Data

Mar. 24, 1980 [JP] Japan .................................. 55-37273

[51] Int. Cl.³ ............................................... G01L 3/04
[52] U.S. Cl. .............................. 73/862.32; 73/862.34; 464/97
[58] Field of Search ........... 73/862.22, 862.32, 862.33, 73/862.34, 862.35; 464/97

[56] References Cited

U.S. PATENT DOCUMENTS

| 839,803 | 1/1907 | Amsler | 73/862.32 |
|---|---|---|---|
| 993,570 | 5/1911 | Webster | 464/97 |
| 2,776,556 | 1/1957 | Gustafson et al. | 464/97 |
| 3,408,830 | 11/1968 | Sutaruk et al. | 464/97 |
| 4,150,566 | 4/1979 | Loebel et al. | 73/862.34 |

FOREIGN PATENT DOCUMENTS 918338 2/1963 United Kingdom ............. 73/862.35

OTHER PUBLICATIONS

"Electrical Variable-Speed Drives", by K. Harada et al., distributed at IEE Conference in London, Sep. 25-27, 1979.

Primary Examiner—Charles A. Ruehl
Attorney, Agent, or Firm—Kurt Kelman

[57] ABSTRACT

Torsion sensor for a grinding machine having a torsion bar with non-linear characteristics provided between the drive shaft of the grinding machine motor and the grinding wheel spindle, and detector means for detecting the twisting angle of the torsion bar.

2 Claims, 9 Drawing Figures

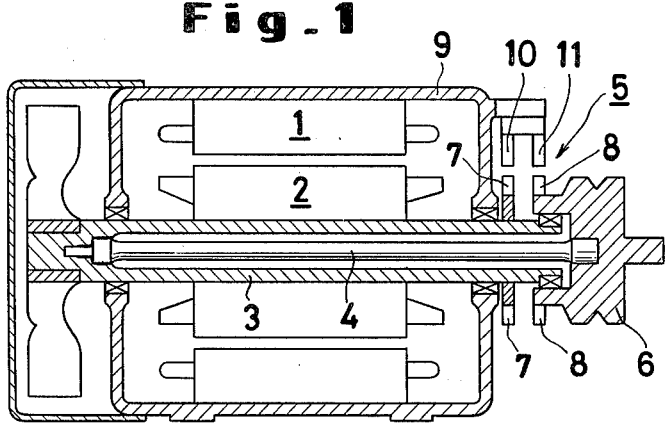
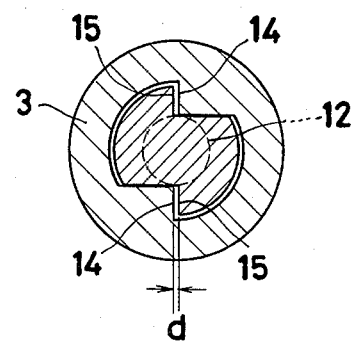
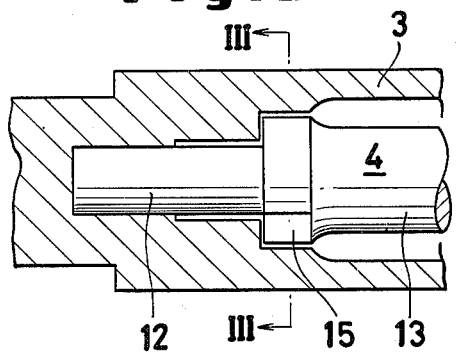
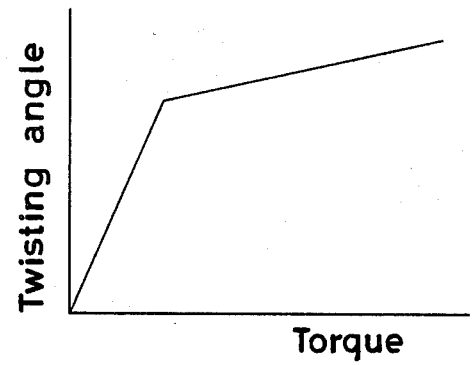
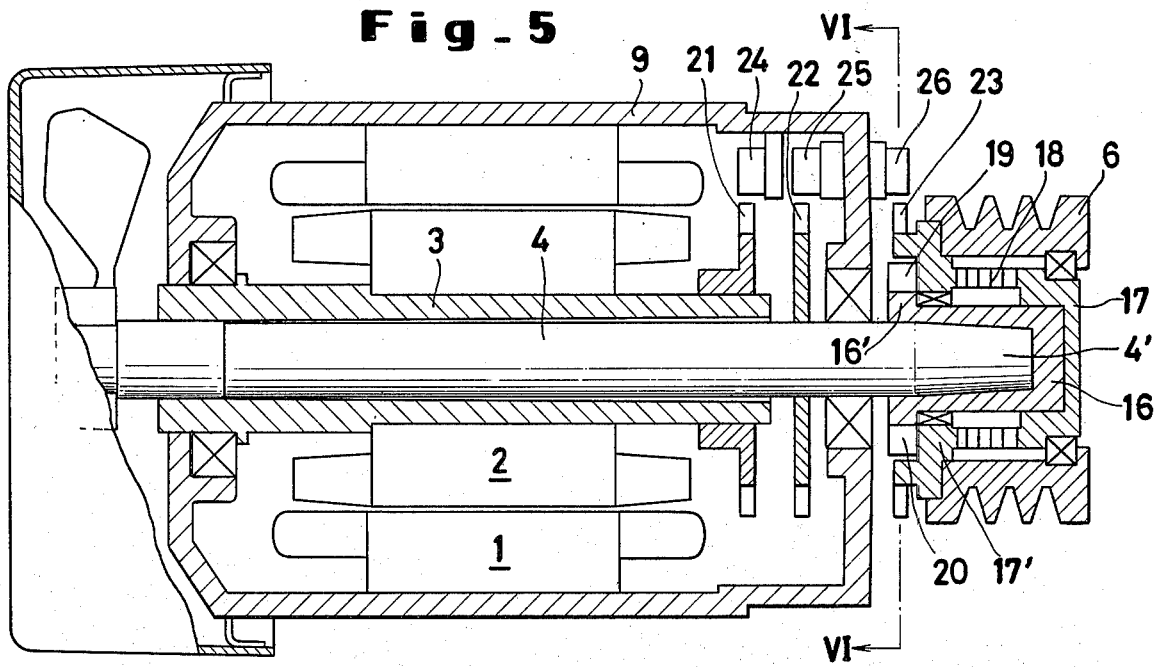

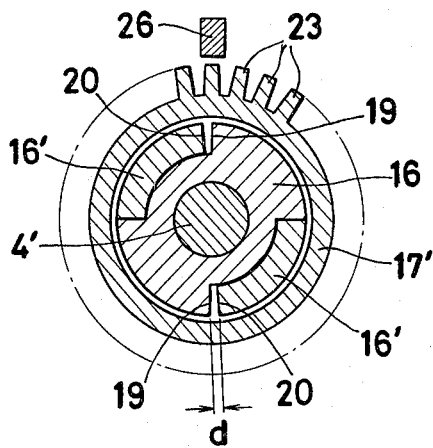
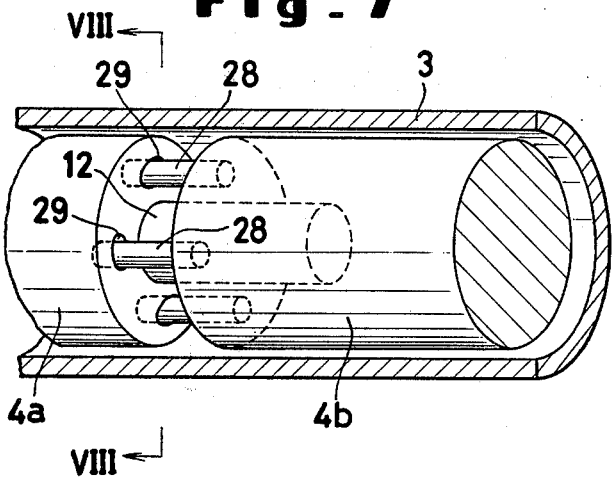
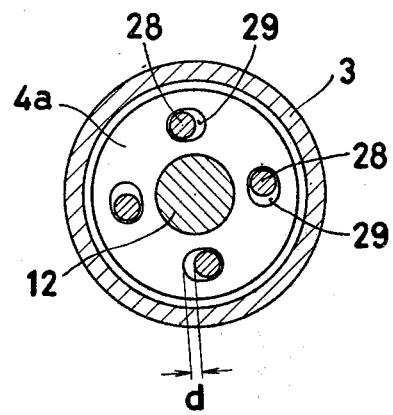
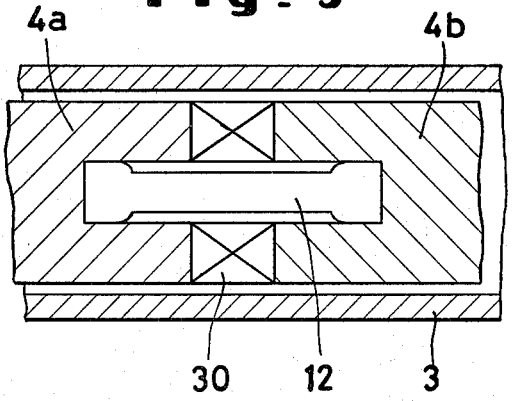

GRINDING MACHINE MOTOR WITH A TORQUE SENSOR

BACKGROUND OF THE INVENTION

This invention relates to a grinding machine motor with a torque sensor that covers the normal torque range of grinding machines while also serving the function of gap elimination.

In order to carry out the grinding operation with high precision and high efficiency, it is essential that the process be carefully monitored and controlled. In the monitor and control of the grinding process, what is required is a sensor capable both of measuring the grinding torque (the most important factor concerned) and of providing adequate response, good reliability and high resolution at the time of low torque (gap elimination capability). Up to now, there has been no sensor available capable of properly carrying out both of these functions.

More specifically, the torque meters which have been used widely in connection with grinding machines cannot be easily adapted for use in gap elimination. On the other hand, the method of torque detection by a wattmeter connected to the motor circuit does not provide adequate response or sufficient resolution. These same problems are also found in another method which uses strain gauges attached to the work center. What is more, none of these conventional methods has made it possible to detect any change in torque before the grinding wheel comes into contact with the workpiece.

In fact, however, as the grinding wheel comes close to the workpiece, there is a slight increase in the motor torque due to the coolant. If a torque sensor capable of covering the torque range encountered in ordinary grinding and having a sufficiently high degree of resolution in the low torque region can be provided, such a sensor would be able to detect the rise in motor torque just before the grinding wheel touches the workpiece and, because of this, would be able to provide effective gap elimination capability. Moreover, use of a torque sensor capable of providing the function of gap elimination in this way would also make it possible to advance the grinding wheel toward the workpiece at high speed up to a point immediately preceding the workpiece without any fear of the grinding wheel colliding with the workpiece. This would be highly effective for reducing the grinding cycle time and would not require any major modification to be made to the signal processing system of the conventional grinding machine.

SUMMARY OF THE INVENTION

One object of this invention is to provide a grinding machine motor with a torque sensor which covers the normal range of torques and affords gap elimination capability with superior reliability and responsiveness.

Another object of this invention is to provide a grinding machine which is capable of in-process measurement of the grinding torque.

In order to realize these objects, the grinding machine motor with a torque sensor in accordance with the present invention is provided between the drive shaft of the motor and the grinding wheel spindle with a torsion bar having a first portion twistable by a small torque and a second portion twistable only by a large torque. In the grinding operation, there is a slight increase in torque caused by the coolant on the workpiece just before the grinding wheel makes contact with the workpiece. This slight increase in torque is detected in terms of the twisting it causes in the first portion of the torsion bar. Then, after the twisting angle of the first portion has reached a certain prescribed degree, the second portion of the torsion bar brings the drive shaft of the motor and the grinding wheel spindle into direct engagement and the grinding operation is carried out in this state with the twisting angle of the torsion bar being simultaneously detected. The grinding machine according to the present invention covers the torque range encountered in ordinary grinding, provides gap elimination capability and is able to carry out in-process measurement of grinding torque.

The other objects and features of the present invention will be understood from the following detailed description made in conjunction with the drawings.

BRIEF EXPLANATION OF THE DRAWINGS

FIG. 1 is a schematic sectional view of a grinding machine motor provided with a torque sensor in accordance with a first embodiment of the present invention;

FIG. 2 is an enlarged sectional view of an essential part of the torque sensor of FIG. 1;

FIG. 3 is a cross-sectional view taken along line III—III in FIG. 2;

FIG. 4 is a graph showing the characteristics of a torsion bar according to the present invention;

FIG. 5 is a schematic sectional view of a grinding machine motor provided with a torque sensor in accordance with a second embodiment of the present invention;

FIG. 6 is a cross-sectional view taken along line VI—VI in FIG. 5;

FIG. 7 is a perspective view of the essential part of another embodiment of the present invention;

FIG. 8 is a cross-sectional view taken along line VIII—VIII in FIG. 7; and

FIG. 9 is a sectional view of still another embodiment of the grinding machine motor with the torque sensor according to the present invention.

DESCRIPTION OF PREFERRED EMBODIMENTS

FIG. 1 shows the structure of a grinding machine motor provided with one embodiment of the torque sensor in accordance with the present invention.

A rotor 2 which rotates relative to a stator 1 is supported by a hollow drive shaft 3 of high rigidity. Accommodated within the drive shaft 3 is a torsion bar 4 having its inward end fixed to the drive shaft 3 and having fixed to its outward end a pulley 6 for transmitting rotational power to a grinding wheel spindle (not shown). The pulley 6 is rotatably supported on the end of the drive shaft 3 via bearings.

The motor has a detector device 5 which detects the transmission torque in terms of the twisting angle of the torsion bar 4, namely the twisting angle between the torsion bar 4 and the drive shaft 3. The detector device 5 consists of markers 7, 8, which may be of magnetic or other type, arranged on the drive shaft 3 and the pulley 6 fixed on the torsion bar 4, respectively, and of detectors 10, 11 mounted on the frame 9 of the motor for detecting the presence of the markers 7, 8. Any twisting of the torsion bar 4 causes a shift in the marker detection times between the two detectors 10, 11 and the torsion is detected in terms of this time shift. The method of detecting the twisting angle of the torsion bar is, however, not limited to that just described and any other appropriate method can be used instead, if so desired. Also, it should be noted that although the illustrated embodiment has a plurality of the markers 7, 8, it is sufficient to provide only one each. Also, instead of providing the markers 8 on the pulley 6 as shown in the drawing, it is possible to provide them on the circumference of a separate disk mounted directly on the torsion bar 4.

As illustrated in FIGS. 2 and 3, the torsion bar 4 has a small diameter portion 12 which is twistable by a small torque and a large diameter portion 13 which is not twisted unless subjected to a large torque. The large diameter portion 13 is provided with a pair of engaging surfaces 15 which in the non-load condition are maintained to be separated from a pair of engaging surfaces 14 provided on the drive shaft 3 by gaps d (FIG. 3). Thus, when a torque develops in the torsion bar 4, the small diameter portion is first twisted by an angle sufficient for it to provide gap elimination capability whereafter the large diameter portion comes into direct engagement with the drive shaft 3. By "gap elimination" is meant the technique of detecting that the grinding wheel has come close to or in contact with the workpiece and, upon detecting such condition, switching over the feed speed of the grinding wheel from rapid feed to grinding feed.

When the torque sensor of this structure is applied to a grinding machine, the small increase in torque which arises just before the grinding wheel comes into contact with the workpiece can be detected in terms of the twisting angle of the small diameter portion 12 of the torsion bar 4. Thus, the torque sensor can work effectively in gap elimination. Then, after the grinding wheel has come into contact with the workpiece, it can serve the same purpose as a conventional torque meter by detecting torques within the range normally encountered in grinding in terms of the twisting angle of the large diameter portion 13 of the torsion bar 4. The relationship between the torque and the twisting angle of the torsion bar is shown in FIG. 4. At first, when the torque is small, the twisting angle of the torsion bar rises sharply as the torque increases. This is because the small diameter portion is easily twisted. Then, after the large diameter portion has come into direct contact with the drive shaft, the twisting angle increases more slowly as indicated by the more gently sloped upper part of the characteristic curve. Taken as a whole, therefore, the relationship between torque and twisting angle can be seen to be non-linear. The material and size of the torsion bar, the ratio between the diameters of the large and small diameter portions, the magnitude of the gaps d, etc. are appropriately determined on the basis of the workpiece grinding conditions.

In the embodiment just described, the gaps d between the respective engaging surfaces have been provided only on one side so that the gaps will be closed by the torsion developed when the motor is operating in the normal forward direction. Needless to say, similar gaps may also be provided on the opposite side so that the same effect can be obtained when the motor rotates in reverse.

FIG. 5 illustrates a grinding machine motor provided with a torque sensor in accordance with another embodiment of the present invention. A torsion bar 4 is accommodated within a hollow drive shaft 3 supporting a rotor 2 and has its one end fixed to the drive shaft 3. The other end of the torsion bar 4 is supported by a bearing provided on the frame 9 of the motor. A cup-shaped member 16 having a collar 16' is fitted over and fixed to the end 4' of the torsion bar 4 projecting beyond the frame 9. The cup-shaped member 16 further has a cup-shaped member 17 fitted thereover and fixed thereto. The cup-shaped member 17 is connected at its open end to a flange 17' via a torsion coil spring 18 and a pulley 6 rotatably mounted on the outer circumference of the cup-shaped member 17 is connected to the flange 17' by a cotter pin, a key-and-slot arrangement or by some other commonly known means (not shown). The torsion coil spring 18 can be formed, for example, by providing a helical cut through the cylindrical side wall of the cup-shaped member 17 while leaving an uncut portion at the open end of the member 17 to serve as the flange 17'. As shown in FIG. 6, the collar 16' of the member 16 has two diametrically opposed notches which engage corresponding projections provided on the inner surface of the flange 17'. The engaging surfaces 19 of the notches and the engaging surfaces 20 are arranged to be separated from each other by gaps d in the non-load condition. Markers 21, 22, 23 are provided on the drive shaft 3, the torsion bar 4 and the cup-shaped member 17 and constitute one part of a detector device for detecting transmission torque in terms of the twisting angle. Detectors 24, 25, 26 are provided on the frame 9 at positions opposite the markers 21, 22, 23, respectively.

When a torque sensor of the structure described above is used in a grinding machine, the coil spring 18 is twisted by an angle large enough to close the gaps d (FIG. 6) due to the small increase in torque occurring just before the grinding wheel comes into contact with the workpiece. This twisting angle is detected between the detectors 25 and 26 and a signal is produced to switch over the wheel feed speed from rapid feed to grinding feed. Then, after grinding has begun with engaging surfaces 19 of the collar 16' in contact with the engaging surfaces 20 of the flange 17', the torque during the grinding operation is detected between detectors 24 and 25 as a pulse phase shift. The invention thus provides a torque sensor which has a gap elimination function and which is also capable of in-process measurement of grinding torque.

The fact that the torque sensor according to the present invention can provide gap elimination capability when applied to a grinding machine makes it possible to greatly reduce idle time, that is the time required for bringing the grinding wheel up to the workpiece. Assume, for example, the rapid feed of the grinding wheel to be 360 mm/min, and the grinding feed to be 0.3 mm/min, the gap between the grinding wheel and the workpiece at the time of switching over to be 0.5 mm, the rapid feed distance to be 50 mm and the depth of the cut to be 0.5 mm. Under these condition the conventional grinding machine not having gap elimination capability would require 50/360 min for the grinding wheel to come into close proximity with the workpiece, 0.5/0.3 min for switching over the feed mode and bringing the grinding wheel into contact with the workpiece, 0.5/0.3 min for the grinding work and 51/360 min for bringing the grinding wheel back to its start position. The total time for one cycle of operation would thus be 3.47 min. On the other hand, if the grinding should be carried out under the same conditions using a grinding machine provided with the torque sensor according to the present invention, it would be possible to bring the grinding wheel right up to the workpiece at the rapid feed speed so that the time required would be 50.5/360 min for bringing the grinding wheel up to the workpiece, 0.5/0.3 min for the grinding work and 51/360 min for bringing the grinding wheel back to its start position, which comes to a total of 1.95 min for one cycle of operation or 45% less than has been required heretofore. Even when the above calculation is repeated assuming the depth of the cut to be 1.0 mm, the time required for one cycle of operation is still 30% less than that required conventionally.

The torque sensor for grinding machines according to the present invention comprises a torsion bar which, being constituted of a first portion which is twistable by a small torque and a second portion which is twistable only by a large torque, is provided between the drive shaft of the grinding machine motor and the grinding wheel spindle. The arrangement is such that an initial small torque twists the first portion of the torsion bar by a given angle so as to bring the drive shaft into direct engagement with the grinding wheel spindle, and therefore can be considered to be one kind of clutch. Thus, the invention is not limited to the particular arrangement illustrated in the embodiments described above but also encompasses any other arrangement serving to provide a clutch-like function of this type.

For example, an arrangement such as that illustrated in FIGS. 7 and 8 may be used. Here, there are provided within the hollow drive shaft 3 a torsion bar 4a connected to the drive shaft and a torsion bar 4b connected to the pulley 6. The ends of the two torsion bars 4a, 4b face each other across a gap and a small diameter portion 12 extending axially from the center of the torsion bar 4a enters an axial hole in the other torsion bar 4b, wherein it is fixed. The end of the torsion bar 4b facing the torsion bar 4a is, on the other hand, provided with a number of rigid rods 28, the ends of which extend into a like number of elongated holes 29 provided in the end of the torsion bar 4a.

With this construction, when the torsion bar 4b on the pulley side is not under load, the rotation of the motor drive shaft 3 is transmitted to the pulley side through the small diameter portion 12. When a small torque is produced in the pulley, the small diameter portion 12 connecting the two torsion bars is twisted until the rods 28 move in the direction of the arrow far enough to close the gap d, whereafter the two torsion bars are linked by the rods 28. The change in torque is detected by a detecting device (not shown).

Another embodiment employing a clutch is shown in FIG. 9. In this embodiment, a first torsion bar 4a connected at one end to the motor drive shaft 3 and a second torsion bar 4b connected at one end to a pulley are connected at their opposing ends through an electric clutch 30. The two torsion bars 4a, 4b are further connected by a small diameter portion (a small diameter torsion bar) 12. The electric clutch 30 is designed not to operate under only a small torque.

Therefore, when there is no load on the pulley side, the rotational force is transmitted from the driving side to the pulley side through the small diameter portion 12. Then when a load is applied to the pulley, the small diameter portion is twisted until, at a certain twisting angle, the twisting is detected and the electric clutch is put into operation, whereafter the two torsion bars are linked by the electric clutch and the rotating force from the drive shaft 3 is transmitted therethrough.

Although in each of the above described embodiments the torque sensor is built into the grinding machine motor, the same effect can also be obtained by providing the torque sensor at a point between the motor drive shaft and the shaft of the grinding wheel.

As can be seen from the description set forth above, this invention makes it possible to realize a highly useful grinding machine motor with a torque sensor which by means of a simple structure provides coverage of the torque range encountered in ordinary grinding while at the same time providing gap elimination capability. Moreover, the present invention makes it possible to convert an ordinary grinding machine into one which has gap elimination function and is capable of in-process measurement of grinding torque, simply by replacing the main shaft of the grinding machine motor with the torque sensor according to this invention.

What is claimed is:

1. A grinding machine motor with a torque sensor, comprising:
   a stator;
   a rotor rotatable relative to said stator;
   a hollow drive shaft rotatably supporting said rotor, the drive shaft defining an axial bore;
   a torsion bar disposed in the axial bore of said hollow drive shaft and having two ends, one end of the torsion bar being fixed to said hollow drive shaft and the other end thereof being connected to a pulley for transmitting its rotation to a grinding wheel spindle, said torsion bar having a first portion twistable by a small torque substantially equivalent to the predetermined motor torque just before the grinding wheel touches a workpiece, and a second portion twistable by a large torque in a range substantially equivalent to the predetermined torque range normally encountered in grinding;
   means for bringing said second portion into direct engagement with said hollow drive shaft after said first portion has been twisted by the small torque; and
   dual-sensitivity detector means for detecting the transmission torque in terms of the twisting angle of said torsion bar, said detector means being capable of detecting the rise in motor torque just before the grinding wheel touches the workpiece by sensing the twisting angle of said first portion of said torsion bar, and of detecting the torque range encountered in ordinary grinding by sensing the twisting angle of said second portion.

2. A grinding machine motor with a torque sensor, comprising:
   a stator;
   a rotor rotatable relative to said stator;
   a hollow drive shaft rotatably supporting said rotor, the drive shaft defining an axial bore;
   a spring assembly including a twist coil spring and a torsion bar having two ends, said torsion bar being disposed in the axial bore of said hollow drive shaft, one end of the torsion bar being fixed to said hollow drive shaft and the other end thereof being connected via said twist coil spring to a pulley for transmitting its rotation to a grinding wheel spindle, said twist coil spring being twistable by a small torque substantially equivalent to the predetermined motor torque just before the grinding wheel touches a workpiece, and said torsion bar being twistable by a large torque in a range substantially equivalent to the predetermined torque range normally encountered in grinding;

means for bringing said torsion bar into direct engagement with said pulley after said twist coil spring has been twisted by the small torque; and, dual-sensitivity detector means for detecting the transmission torque in terms of the twisting angle of said spring assembly, said detector means being capable of detecting the rise in motor torque just before the grinding wheel touches the workpiece by sensing the twisting angle of said twist coil spring, and of detecting the torque range encountered in ordinary grinding by sensing the twisting angle of said torsion bar.

* * * * *

UNITED STATES PATENT AND TRADEMARK OFFICE
CERTIFICATE OF CORRECTION

PATENT NO. : 4,432,245
DATED : FEBRUARY 21, 1984
INVENTOR(S) : HATTORI ET AL

It is certified that error appears in the above—identified patent and that said Letters Patent is hereby corrected as shown below:

Title page, [73], the first Assignee should be --Agency of Industrial Science Technology--.

Signed and Sealed this

Tenth Day of July 1984

[SEAL]

Attest:

GERALD J. MOSSINGHOFF

Attesting Officer

Commissioner of Patents and Trademarks